United States Patent
Steen et al.

(10) Patent No.: US 7,435,201 B2
(45) Date of Patent: Oct. 14, 2008

(54) ENGINE DRIVEN VEHICLE WITH EXHAUST CLEANING

(75) Inventors: Marcus Steen, Angered (SE); Anders Eriksson, Gothenburg (SE); Sixten Berglund, Torslanda (SE); Soren Udd, Nodinge (SE)

(73) Assignee: Volvo Lastvagnar AB, Gothenburg (SE)

( * ) Notice: Subject to any disclaimer, the term of this patent is extended or adjusted under 35 U.S.C. 154(b) by 248 days.

(21) Appl. No.: 11/164,746

(22) Filed: Dec. 4, 2005

(65) Prior Publication Data

US 2006/0196285 A1  Sep. 7, 2006

Related U.S. Application Data

(63) Continuation of application No. PCT/SE2004/000855, filed on Jun. 2, 2004, now abandoned.

(30) Foreign Application Priority Data

Jun. 4, 2003  (SE)  .................. 0301614

(51) Int. Cl.
*F16H 59/00*  (2006.01)
(52) U.S. Cl. ...................................... 477/98
(58) Field of Classification Search ............ 477/98, 477/100
See application file for complete search history.

(56) References Cited

U.S. PATENT DOCUMENTS

| | | | |
|---|---|---|---|
| 3,895,541 A | 7/1975 | Nohira et al. | |
| 4,034,626 A | 7/1977 | Udagawa et al. | |
| 5,131,293 A | 7/1992 | Kaiser et al. | |
| 5,997,434 A * | 12/1999 | Graf et al. | 477/98 |
| 6,314,356 B1 | 11/2001 | Schmid et al. | |
| 6,584,393 B1 * | 6/2003 | Vollmar | 701/55 |
| 2007/0225116 A1 * | 9/2007 | Berglund et al. | 477/111 |

FOREIGN PATENT DOCUMENTS

| | | |
|---|---|---|
| DE | 4332456 A1 | 3/1995 |
| JP | 4039460 A | 2/1992 |
| WO | 2004/109160 A1 | 12/2004 |

OTHER PUBLICATIONS

International Search Report dated Jul. 20, 2004.
English Abstract of DE4332456, esp@cenet database—Worldwide.
English Abstract of JP04039460A2, The Delphion Integrated View.

* cited by examiner

*Primary Examiner*—Dirk Wright
(74) *Attorney, Agent, or Firm*—Novak Druce + Quigg, LLP

(57) ABSTRACT

Method and arrangement for achieving lower emissions during operation of a vehicle that includes comprising a combustion engine (10) that emits exhaust gases into an exhaust system (140) having a catalyzes (320). An injection device (310) is arranged to inject a substance into the exhaust system and a transmission (90) is provided that is driven by the engine. The method includes selecting a gear in the vehicle's transmission in response to at least information about whether catalytic conversion is required and information about the temperature (T) in the exhaust system so that the selected gear regulates the temperature in the exhaust system.

10 Claims, 4 Drawing Sheets

ENGINE DRIVEN VEHICLE WITH EXHAUST CLEANING

CROSS-REFERENCE TO RELATED APPLICATIONS

The present application is a continuation patent application of International Application No. PCT/SE2004/000855 filed 02 Jun. 2004 which is published in English pursuant to Article 21(2) of the Patent Cooperation Treaty and which claims priority to Swedish Application No. 0301614-4 filed 04 Jun. 2003. Said applications are expressly incorporated herein by reference in their entireties.

TECHNICAL FIELD OF THE INVENTION

The present invention relates to a method for achieving lower emissions when operating a vehicle comprising a combustion engine that emits exhaust gases to an exhaust system comprising a catalyzer, injection device that is arranged to inject a substance into the exhaust system, and a transmission that is driven by the engine.

The present invention also relates to a computer program for carrying out such a method using a computer.

The present invention also relates to a engine driven vehicle comprising a combustion engine that, when operating, emits exhaust gases to an exhaust system comprising a catalyzer, control device, injection device that is arranged to inject a substance into the exhaust system, and a transmission that is driven by the engine.

BACKGROUND OF THE INVENTION

Various types of catalyzer for exhaust cleaning are currently used in engine driven vehicles in order to obtain lower emissions. These catalyzers are used to reduce to some extent the emission of, for example, nitrogen compounds (NOx). Due to various circumstances, the catalyzers may work less well, resulting in a smaller quantity of the exhaust gases being converted into, for example, nitrogen or water, which results in unnecessarily large exhaust emissions when operating said vehicles.

SUMMARY OF THE INVENTION

An object of the invention is to provide a method for achieving lower emissions in an engine driven vehicle in a cost-effective way.

This object is achieved by a method of the type described in the introduction, by selecting a gear in the vehicle's transmission in response to at least information to the effect that catalytic conversion is required and information concerning the temperature in the exhaust system so that the selected gear regulates the temperature in the exhaust system.

An advantage that is achieved by this solution is obtained by utilization of the synergy between the transmission and the combustion engine that emits exhaust gases to the exhaust manifold during operation. This advantage can be obtained by selecting the speed of the engine and the gear of the transmission during the operation of the vehicle, for example so that the speed of rotation of the outgoing shaft from the transmission is essentially retained, while the speed of the engine is changed so that the exhaust temperature changes value. This temperature regulation produces, in turn, the lower exhaust emissions. This solution is very cost effective, as the vehicle does not need to be provided with additional components according to the invention.

The method according to the invention means that the catalyzer can be used for a longer period of time, as it is not subjected to such large stresses as was previously the case, in particular those relating to too high temperatures. By means of the method, exhaust cleaning in engine vehicles can work better in practice.

As the catalyzer is given a longer life, this has the advantage that it does not need to be removed from the vehicle in order to be repaired or replaced as often as was previously the case, which means that the invention saves both time and money, as the vehicle does not need to be brought into a workshop to the same extent as was previously the case.

With a well-controlled temperature in the exhaust system, the risk is minimized that substances that are used as reagents in various procedures for reducing emissions will be adversely affected by, for example, too high temperatures, or will become inactive at too low temperatures.

According to an embodiment of the invention, lower emissions are achieved by means of a catalyzer in a vehicle's exhaust system. The catalyzer can be of the SCR type (Selective Catalytic Reduction). By actively changing the gear in the vehicle's drive line while retaining the engine output, even at low engine speeds, an optimal temperature for an SCR-catalyzer can be obtained. This optimal temperature can be in a range around 300° C. With a temperature that is optimal for the catalyzer, a more efficient catalysis can be obtained between, for example, a substance injected into the exhaust system and NOx-compounds, whereby larger amounts of nitrogen and water are created in the catalyzer. The nitrogen and the water can then be discharged out of the exhaust system.

The method involves a combined control of the engine and transmission.

By means of temperature sensors, a control unit can determine when it is time to improve the catalysis in the catalyzer. In the event of an indication, or after calculations, the control unit can temporarily deviate from stored gear selection strategies and possibly also optimal fuel consumption in order to adjust the temperature in the vehicle's exhaust system and hence also the temperature of a substance, for example urea, injected into the exhaust system. For example, when the engine has high output, a control unit can actively change to a temperature-limiting strategy. In concrete terms, this can mean a changing down in the transmission. With constant engine output, the temperature drops in the exhaust system, as the engine speed increases. When the exhaust temperature in the exhaust system, and hence also the substrate temperature has reached the required temperature, the ordinary gear change strategy can be applied. The control unit is also designed to consider whether it is more advantageous to adjust the temperature at a later time than when a first indication is received.

DETAILED DESCRIPTION

Figure 1:
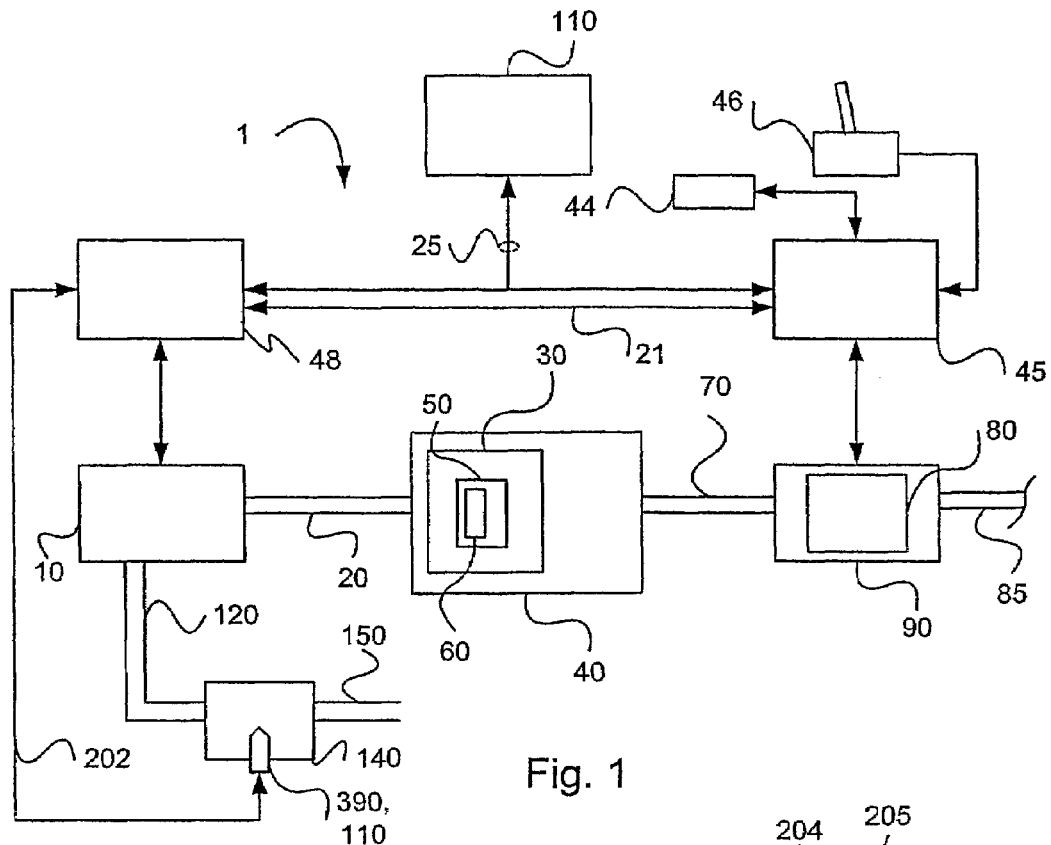
FIG. 1 shows a schematic illustration of a vehicle and a control system for the same.

FIG. 1 shows a schematic illustration of a vehicle 1 and a control system for the same according to an embodiment of the present invention, in which 10 represents a six-cylinder combustion engine, for example a diesel engine, the crankshaft 20 of which is connected to a single-plate dry plate clutch represented in general by 30, which is enclosed in a clutch case 40. Instead of a single-plate clutch, a two-plate clutch can be used. The crankshaft 20 is connected to the clutch housing 50 of the clutch 30 in such a way that it cannot rotate, while its clutch plate 60 is connected in such a way that it cannot rotate to an incoming shaft 70, which is mounted in such a way that it can rotate in the housing 80 of a gear box represented in general by 90. A main shaft and an intermediate shaft are mounted in the housing 80 in such a way that they can rotate. An outgoing shaft 85 from the gearbox 90 is arranged to drive the vehicle's wheels.

A first pipe 120 is arranged to conduct exhaust gases from the engine's combustion chambers to an exhaust manifold 140, which manifold 140 is arranged for exhaust cleaning. A second pipe 150 is arranged to conduct cleaned exhaust gases, and the remnants of the uncleaned exhaust gases, from the manifold 140 and out of the vehicle.

In addition, a first control unit 48 for controlling the engine 10 and a second control unit 45 for controlling the transmission are illustrated. The first and the second control units are arranged to communicate with each other via a databus 21. In the following, it is described how different processes and method steps are carried out in the first control unit 48, but it should be made clear that the invention is not limited to this, but that the second control unit 45, or a combination of the first and second control units, can be equally well used.

Sensors, detectors and transducers have the common designation detectors 110. The detectors 110 are arranged to communicate with both the first and the second control units via a databus 25. The detectors 110 can, for example, comprise a temperature sensor 390 for exhaust gases, which can be placed in association with the manifold 140.

The first control unit is arranged to receive trip (journey) data, such as for example the amount of fuel used and the engine's momentary load, from the detectors 110, and to process the trip data in order to calculate, for example, the vehicle's exhaust emissions in real time. The first control unit is arranged in particular to receive information indicating the temperature in the exhaust system.

The temperature in the exhaust system can be a qualitative average value from a plurality of temperature sensors placed inside and in association with the vehicle's exhaust system.

The vehicle 1 comprises a throttle control 44 and a manual gear selector 46, which is arranged to communicate with the second control unit 45. The gear selector 46 can have one position for manual gear selection and one for automatic gear selection for the vehicle.

Figure 2:
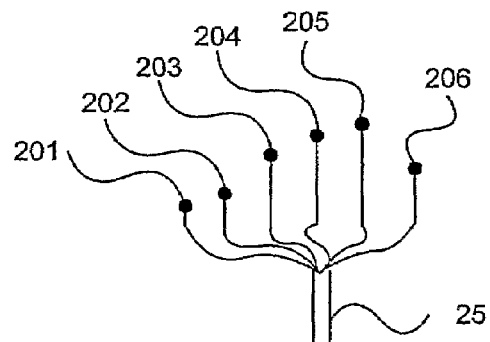
FIG. 2 shows a databus with examples of detected or calculated data, which is used according to the invention.

FIG. 2 represents a databus 25 and examples of journey data recorded or calculated by the detectors 110. Examples of detected or calculated momentary parameters are engine torque 201, exhaust temperature 202, engine output 203, vehicle acceleration 204, exhaust back pressure 205 and fuel consumption 206. Other parameters can be injection timing, EGR valve position, NOP (Needle Opening Pressure). Using the above parameters, the first control unit can calculate, for example, exhaust emissions. The calculations are preferably carried out in real time.

The above parameters can be measured directly using measuring devices for measuring the respective parameters. Alternatively, the respective parameters can be calculated indirectly by observing other parameters than the respective parameters, for example by model-based estimation.

Figure 3A:
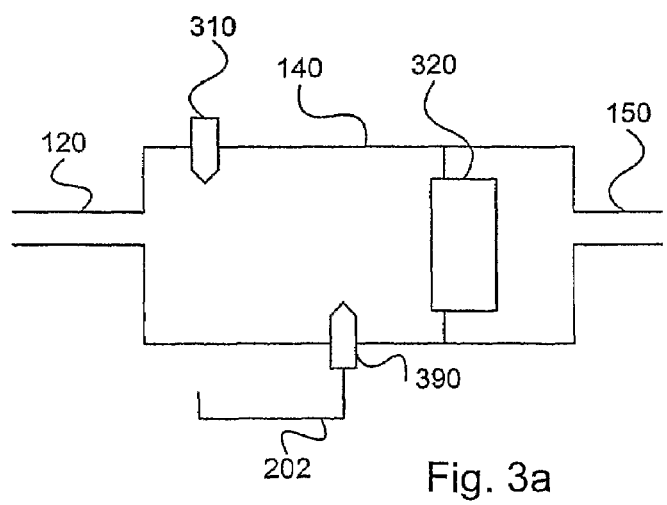
FIG. 3a shows a schematic illustration of an exhaust system for a vehicle.

FIG. 3a shows a schematic illustration of an exhaust system according to an embodiment of the invention. The first pipe 120 is arranged to take exhaust particles from the vehicle's combustion chambers to the manifold 140 in which the exhaust gases are completely or partially cleaned. In addition, the second pipe 150 is arranged to take the cleaned exhaust gases from the manifold 140 out of the vehicle 1. The manifold 140 can be made of stainless steel. The manifold 140 comprises an injector 310, which according to an embodiment of the invention can be an injector for urea. The first control unit is arranged to control the injection of substances into, for example, the manifold 140 via the injector. The manifold 140 additionally comprises a catalyzer 320, which according to an embodiment of the invention can be an SCR-catalyzer. Typically, nitrogen (N2) and water (H2O) are formed in the catalyzer 320 from urea and NOx-compounds, such as for example nitrogen trioxide (NO3), under the influence of temperature. The catalyzer 320 can consist of a ceramic material and have a catalytic coating.

Urea can react chemically with NOx-compounds in the catalyzer 320 in certain temperature conditions. Such a reaction can be started up by causing the temperature in the manifold 140 to attain a suitable value. The result of such a reaction is nitrogen and water. The water can be in gaseous form. The second pipe 150 is arranged to take the nitrogen and the water from the manifold 140 and out of the vehicle 1 after the catalysis.

Figure 3C:
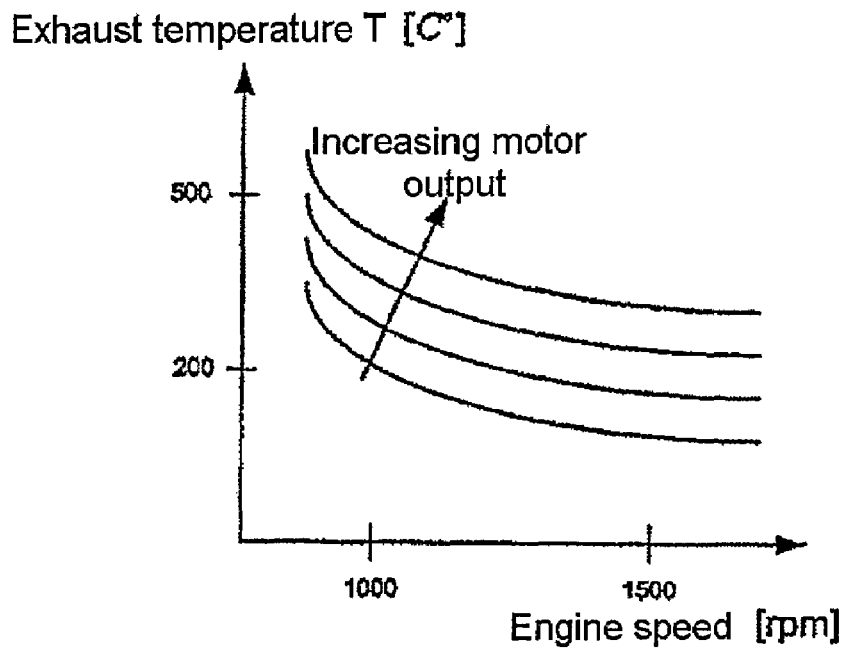
FIG. 3c shows a diagram for how different constant engine outputs vary with regard to temperature and engine speed.
Figure 3B:
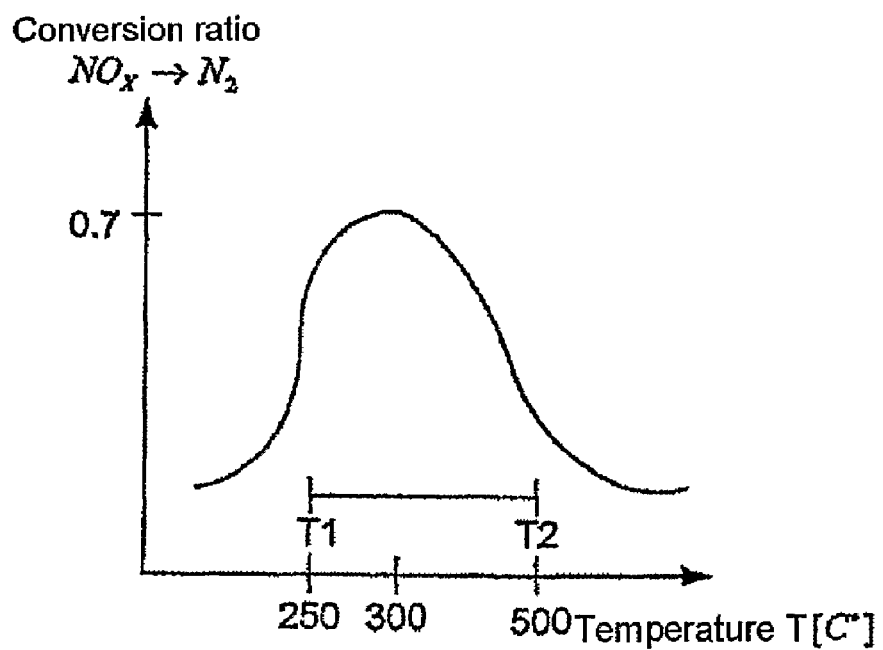
FIG. 3b shows a diagram with a conversion ratio of NOX in a catalyzer.

FIG. 3b illustrates how the conversion ratio of NOx-compounds to N2 in the catalyzer 320 is dependent upon the exhaust temperature. The conversion ratio is also dependent upon the catalyzer temperature and the injection of, for example, urea the exhaust system. It can be seen in the figure that the highest conversion ratio, according to this example 0.7, is obtained at a temperature of approximately 300° C. In addition, it can be seen that the conversion ratio is relatively high within a temperature range T1-T2. This temperature range can be between 250 and 500° C. For substances other than urea, the temperature range can be different.

FIG. 3c illustrates how various constant engine outputs are dependent upon the exhaust temperature T[°C.] in the vehicle's exhaust system and the engine speed [rpm]. FIG. 3c shows that the exhaust temperature increases if the engine speed is reduced with a constant engine output. In addition, the figure shows that higher exhaust temperatures can be obtained with a higher constant engine output when the engine speed is reduced.

Figure 4A:
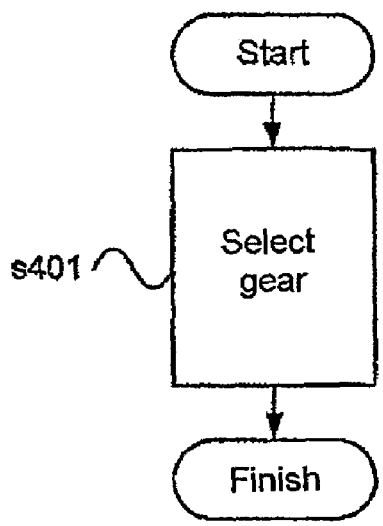
FIG. 4a shows a flowchart illustrating a method according to an embodiment of the invention.

FIG. 4a shows a flow chart illustrating a method for obtaining lower emissions in an engine driven vehicle according to an embodiment of the invention.

The method comprises the step s401 during operation of a vehicle comprising (including, but not necessarily limited to) a combustion engine 10 that emits exhaust gases to an exhaust system 140 comprising a catalyzer 320, injection device 310 that is arranged to inject a substance into the exhaust system, and a transmission 90 that is driven by the engine. The method includes selecting a gear in the vehicle's transmission in response to at least information to the effect that catalytic conversion is required and information about temperature (T)

in the exhaust system so that the selected gear regulates the temperature in the exhaust system.

According to an embodiment of the invention, urea can react with NOx-gases under the influence of temperature in the catalyzer 320. These components are converted to nitrogen and water, which can then be taken out of the exhaust system via the pipe 150.

Figure 4B:
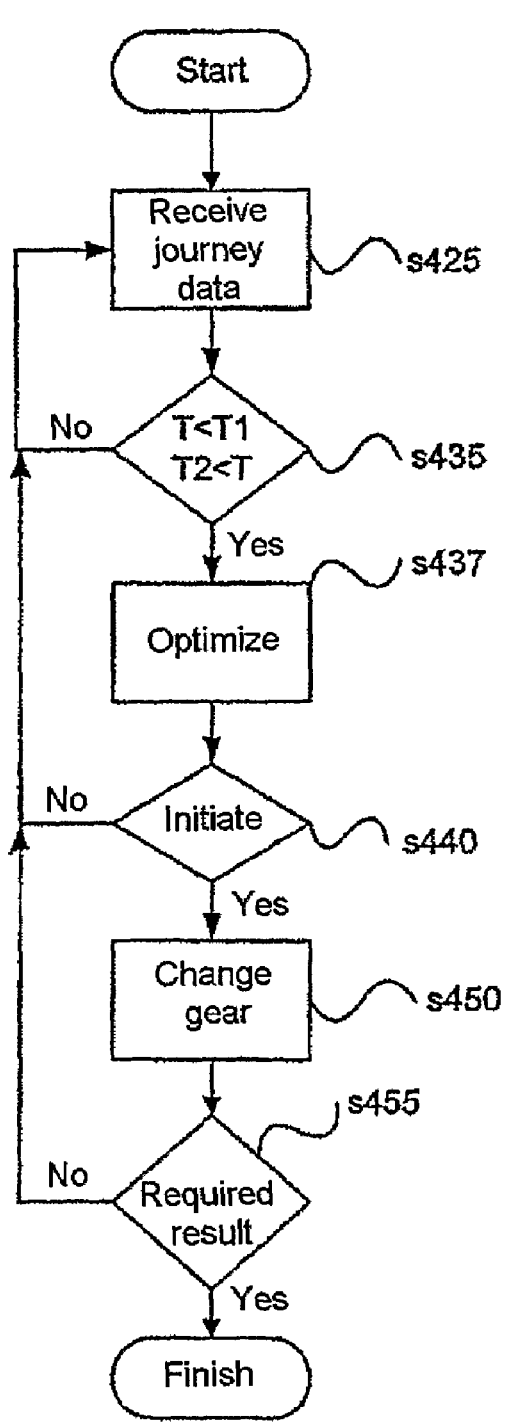
FIG. 4b shows a flowchart illustrating a more detailed method according to an embodiment of the invention.

FIG. 4*b* shows a more detailed flow chart illustrating a method according to an embodiment of the invention. The method comprises the step s425 of receiving in the first control unit 48 trip data such as, for example, 201-206 from the detectors 110. T can be a qualitative value of the exhaust temperature in the exhaust system in the vehicle. T can also be the temperature in the manifold 140. T can also be the temperature of the manifold 140. T can be the temperature of the catalyzer.

T1 and T2 are a first and a second limit value respectively, between which the temperature T should be in order to obtain a qualitative catalysis in the catalyzer 320. T1 can be a lower limit. T1 can be 250° C. T2 can be an upper limit. T2 can be 500° C. According to a second embodiment, T1 can be 275° C. and T2 can be 475° C.

In step s435, T is compared in the first control unit 48 with the stored, predetermined T1 and T2. If T is greater than T2, this is an indication that there is a need to reduce the temperature in the exhaust system, and method step s437 follows. If the comparison shows that T is less than T1, this is an indication that there is a need to increase the temperature in the exhaust system, and method step s437 follows. Otherwise there is a return to method step s425.

In an embodiment of the invention, in the event of a return to step s425, the temperature range is reduced before the next repetition in order to achieve an optimizing of said conversion ratio of NOx-compounds to nitrogen. The system can automatically reset the reduced range T1-T2 when required.

In method step s437, a qualitative optimizing is carried out of which gear is best in order to achieve a required result with regard to temperature regulation in the exhaust system. The optimizing can be carried out in accordance with a gear selection strategy stored in the second control unit 45. The optimizing can be carried out on the basis of a plurality of different parameters, such as for example the gear in the drive line and time with changed gear in the drive line. In this way it is determined how long to stay in any changed gear in the vehicle's drive line and what result it is desirable to achieve; that is, for example, what final temperature the exhaust system or the substrate is to achieve.

In method step s440, it is determined whether implementation of the optimizing is to be initiated immediately or whether initiation at a later stage is preferable. An example of a traffic situation in which initiation is preferably postponed until a later stage can be when the vehicle is on the way up a hill and a change up in order to achieve an increase in temperature in the exhaust system would be less expedient as the engine would be forced to operate at too low a speed. If initiation is not to take place immediately, there is a return to s425.

After the initiation, the same is implemented in method step s450 in which the gear in the vehicle's driveline is changed if required. The gear can be changed in one or several steps. For example, the gear can be changed from a fifth gear to a third gear in order to achieve a reduction in temperature in the exhaust system over a certain period of time.

In method step 455, the result of the procedure is evaluated. This can be carried out using models stored in the first control unit with input from the detectors 110. If the result is the one required or is sufficiently good, the method is terminated; otherwise there is a return to method step s425.

Figure 5:
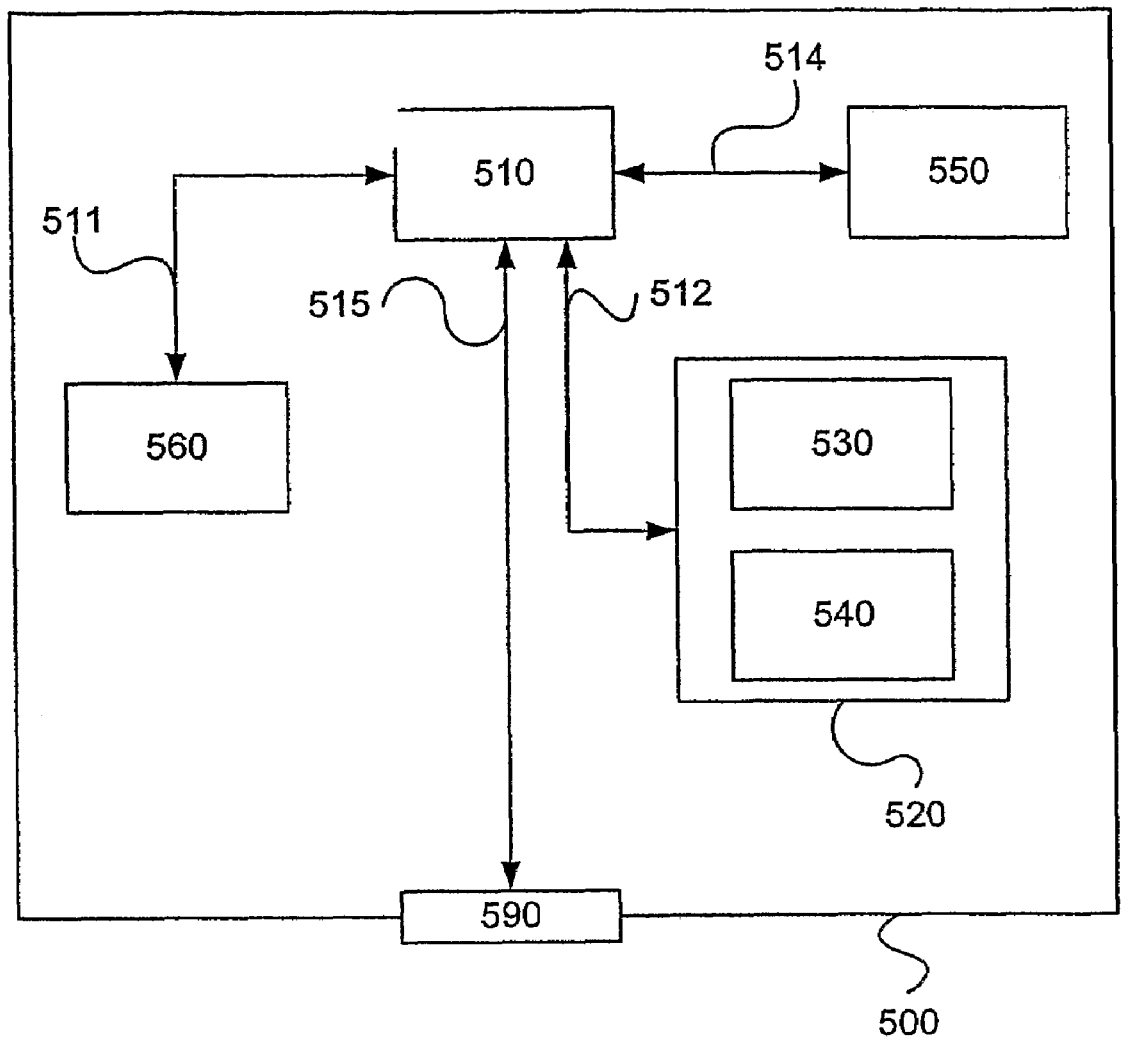
FIG. 5 shows an apparatus, which is used according to at least one embodiment of the invention.

FIG. 5 shows an apparatus 500, according to an embodiment of the invention, comprising a non-volatile memory 520, a processor 510 and a read and write memory 560. The memory 520 has a first memory part 530, in which a computer program for controlling the apparatus 500 is stored.

The computer program in the memory part 530 for controlling the apparatus 500 can be an operating system.

The apparatus 500 can be comprised in, for example, a control unit, such as the control unit 45 or 48. The data-processing unit 510 can comprise, for example, a microcomputer.

The memory 520 also has a second memory part 540, in which a program for exhaust cleaning in an engine driven vehicle is stored. In an alternative embodiment, the program for exhaust cleaning in a engine driven vehicle is stored in a separate non-volatile data-storage medium 550, such as, for example, a CD or a plug-in semiconductor memory. The program can be stored in an executable form or in a compressed state.

When it is described in the following that the data-processing unit 510 executes a special function, it should be clear that the data-processing unit 510 executes a special part of the program which is stored in the memory 540 or a special part of the program which is stored on the non-volatile recording medium 550.

The data-processing unit 510 is arranged to communicate with the memory 550 by means of a databus 514. The data-processing unit 510 is also arranged to communicate with the memory 520 by means of a databus 512. In addition, the data-processing unit 510 is arranged to communicate with the memory 560 by means of a databus 511. The data-processing unit 510 is also arranged to communicate with a data port 590 by means of a databus 515.

The methods which are described in FIG. 4*a* and FIG. 4*b* can be carried out by the data-processing unit 510 by means of the data-processing unit 510 executing the program which is stored in the memory 540 or the program which is stored on the non-volatile recording medium 550.

What is claimed is:

1. A method for achieving lower emissions during the overall course of operation of a vehicle comprising a combustion engine (10) that emits exhaust gases to an exhaust system (140) comprising a catalyzer (320), injection device (310) that is arranged to inject a substance into the exhaust system, and a transmission (90) that is driven by the engine, the method comprising:

selecting a gear in the vehicle's transmission in response to at least information about whether catalytic conversion is required and information about the temperature (T) in the exhaust system so that the selected gear regulates the temperature in the exhaust system to within a range selected to optimize catalytic conversion of the exhaust gases when catalytic conversion is called for;

wherein one of (1) urea and (2) carbamide and (3) ammonia is injected.

2. The method as recited in claim 1, wherein a gear in the vehicle's transmission is selected (s435) in response to a comparison of said information indicating the temperature of the exhaust system and information about a predetermined limit value.

3. The method as recited in claim 1, wherein a gear in the vehicle's transmission is selected (s435) so that the temperature of the exhaust system is regulated to be within a range between a first temperature (T1) and a second temperature (T2), and the first temperature (T1) is at least 250 degrees Celsius and the second temperature (T2) is at most 500 degrees Celsius.

4. The method as recited in claim 1, further comprising execution of said method steps on a computer utilizing a computer program comprising program code.

5. The method as recited in claim 4, wherein the program code is stored on a medium that can be read by the computer thereby constituting a computer program product.

6. The method as recited in claim 4, wherein the program code is loaded directly into an internal memory of the computer thereby constituting a computer program product.

7. An engine driven vehicle comprising:
   a combustion engine (10) which during operation emits exhaust gases into an exhaust system (140) comprising a catalyzer (320);
   an injection device (310) arranged to inject a substance into the exhaust system;
   a transmission (90) driven by the engine;
   control devices (48; 45) configured to select a gear in the vehicle's transmission, in response to at least information about whether catalytic conversion is required and information about a temperature (T) in the exhaust system, in a manner that the selected gear regulates the temperature in the exhaust system (140) to within a range selected to optimize catalytic conversion of the exhaust gases when catalytic conversion is called for.

8. The engine driven vehicle as recited in claim 7, wherein the control devices (48; 45) are configured to select a gear in the vehicle's transmission in response to a comparison of said information indicating the temperature of the exhaust system and information about a predetermined limit value.

9. The engine driven vehicle as recited in claim 7, wherein the control devices (48; 45) are configured select a gear in the vehicle's transmission so that the temperature of the exhaust system is regulated to be within a range between a first temperature (T1) and a second temperature (T2), where the first temperature (T1) is at least 250 degrees Celsius and the second temperature (T2) is at most 500 degrees Celsius.

10. A method for achieving lower emissions during the overall course of operation of a vehicle comprising a combustion engine (10) that emits exhaust gases to an exhaust system (140) comprising a catalyzer (320), injection device (310) that is arranged to inject a substance into the exhaust system, and a transmission (90) that is driven by the engine, the method comprising:
   selecting a gear in the vehicle's transmission in response to at least information about whether catalytic conversion is required and information about the temperature (T) in the exhaust system so that the selected gear regulates the temperature in the exhaust system to within a range selected to optimize catalytic conversion of the exhaust gases when catalytic conversion is called for.

* * * * *